L. BRADLEY & W. A. SCHMIDT.
METHOD OF SEPARATING CERTAIN CONSTITUENTS FROM A GAS OR MIXTURE OF GASES.
APPLICATION FILED JULY 23, 1914.
1,221,505.  Patented Apr. 3, 1917.
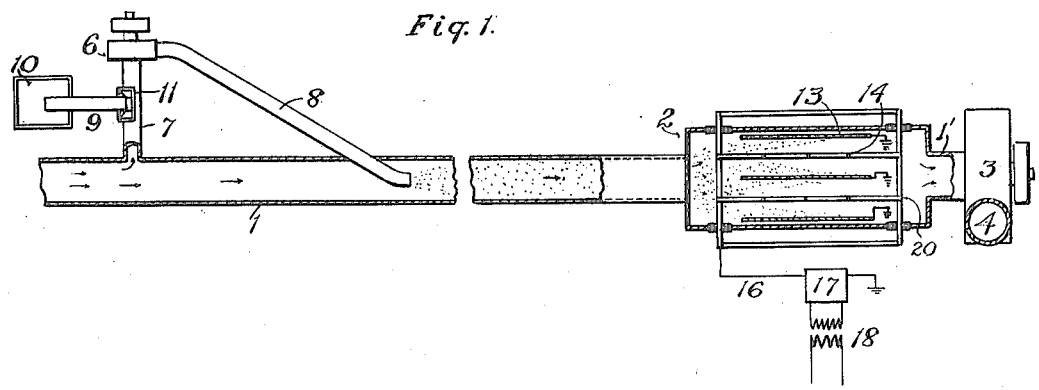
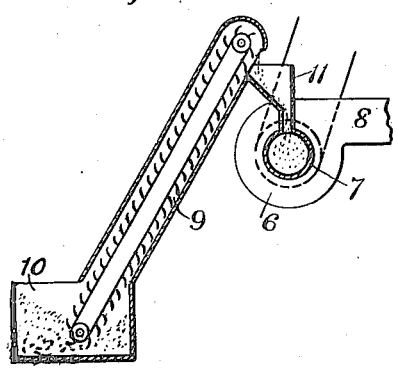
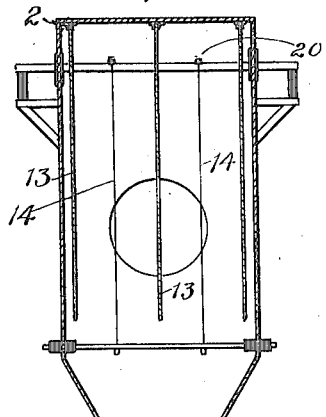
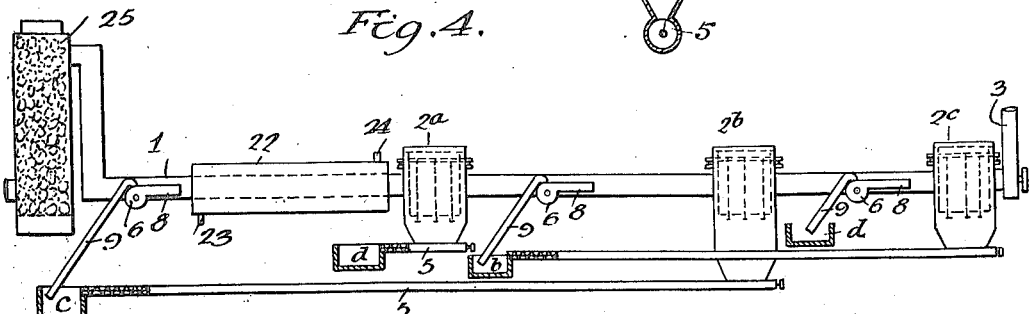
WITNESSES:
INVENTORS:
Linn Bradley
Walter August Schmidt
by Arthur P. Knight
ATTORNEY

UNITED STATES PATENT OFFICE.

LINN BRADLEY, OF EAST ORANGE, NEW JERSEY, AND WALTER AUGUST SCHMIDT, OF LOS ANGELES, CALIFORNIA, ASSIGNORS TO RESEARCH CORPORATION, OF NEW YORK, N. Y., A CORPORATION OF NEW YORK.

METHOD OF SEPARATING CERTAIN CONSTITUENTS FROM A GAS OR MIXTURE OF GASES.

1,221,505.      Specification of Letters Patent.      Patented Apr. 3, 1917.

Application filed July 23, 1914. Serial No. 852,719.

*To all whom it may concern:*

Be it known that we, LINN BRADLEY, residing at East Orange, county of Essex, State of New Jersey, and WALTER AUGUST SCHMIDT, residing at Los Angeles, county of Los Angeles, State of California, citizens of the United States, have invented a new and useful Method of Separating Certain Constituents from a Gas or Mixture of Gases, of which the following is a specification.

This invention relates to removing certain gaseous constituents from a mixture of gases or from a compound gas and the main object of the invention is to provide for such operation where the gas to be removed is not readily separable by condensation.

The invention consists essentially in distributing into the gas or mixture of gases to be treated, a solid pulverulent substance, which is capable of reacting chemically or physically with the constituents to be separated from said gas or mixture of gases in such manner as to form a cloud, mist, or fume of suspended particles, and in then removing such suspended particles from the remainder of the gas.

In the industries there are many cases where it is desirable to remove from certain gaseous bodies one constituent thereof, but where the removal of such portion of the gas offers serious difficulties in practice. This is particularly the case when the constituent to be removed cannot be condensed, sublimed, or absorbed by the usual commercial methods. In many cases the mixture of gases consists of permanent gases where condensation or sublimation is entirely impracticable as a means of fractionating or separating one constituent of the mixture from another, and where the use of ordinary absorption processes is objectionable, requiring large and expensive absorption means to furnish the necessary surface and conditions for absorption of the gas-constituent. Ordinarily, difficulties are encountered even with such provision in removing the desired constituent effectively and with satisfactory completeness. Such difficulties are met with, for example, in the removal of chlorin from a mixture of gases, such as chlorin-laden air. For the absorption of such chlorin it has been proposed to pass the gases through absorption towers or chambers containing hydrated calcium oxid, the chlorin being absorbed by the calcium hydroxid. When large volumes of gases are treated in this manner, difficulty is encountered in removing the last traces of chlorin, by reason of the difficulty of bringing the gases into sufficiently intimate contact with the absorbent material. The fundamental purpose of our invention is to bring the absorbent material quickly into intimate contact with the gases under treatment, and for continually renewing the absorbing agent so that the absorption takes place with maximum rapidity and effectiveness. This object we accomplish by distributing the absorbing agent throughout the gas, in the form of a cloud of suspended particles, presenting maximum surface to permit the absorption, thereby causing rapid separation of the desired constituent from the gaseous state. We then precipitate the cloud of absorbing material, together with the constituent absorbed thereby from the gases.

Our method is applicable to a wide range of industrial and chemical processes, and while it depends fundamentally on the utilization of a cloud or mist of solid or liquid particles in the gas under treatment, this cloud or mist may be formed in various ways according to the special conditions of the problem. Thus, for example it may be formed by spraying, forcing, or blowing solid particles into the gases, or otherwise, as hereinafter set forth.

Any suitable apparatus may be used in carrying out our method, for example that shown in the accompanying drawings, wherein:

Figure 1 is a horizontal section of an apparatus suitable for the absorption of chlorin, by our method, from gases such as occur in bleaching powder manufacture.

Fig. 2 is a vertical section of the means for feeding the absorbent material.

Fig. 3 is a vertical section of the treater or precipitator.

Fig. 4 is a partly sectional side elevation of another form of apparatus for carrying out our invention.

The apparatus shown in Fig. 1 comprises a flue or pipe 1 connected to receive chlorin-laden air from any source thereof, means for supplying hydrated lime dust (calcium hydroxid) to such flue or pipe, an electric treater or precipitator 2, for precipitating the dust after it has absorbed the chlorin, and a fan or blower 3 for drawing the chlorin laden air or gases through the flue or pipe 1, and through the treater 2, and discharging the residual air or gases through a stack or flue 4. The means for supplying the finely divided calcium hydroxid to the gases passing through pipe or flue 1 may consist, for example, as shown, of a fan or blower 6 having its intake pipe 7 connected to the pipe 1, and having an outlet pipe 8 connected to said pipe 1 at a point in advance of the treater 2, and means 9 for feeding the calcium hydroxid to the intake pipe, said feeding means 9 consisting of an elevator lifting the finely divided calcium hydroxid from a bin 10, and depositing it in a hopper 11 which delivers it to the pipe 7.

The treater 2 may be of any suitable construction, adapted to effectively precipitate the dust or finely divided absorbing agent. We prefer to use an electric precipitator, on account of the rapidity and completeness of the precipitation which can be effected therewith. In applying our method in connection with the manufacture of bleaching powder where the effluent gases, under usual practice at present, contain considerable chlorin, the chlorin is sufficiently diffused as to necessarily demand that the absorbent material be so attenuated, that any of the usual precipitating means, such as settling chambers, would be out of the question, and it is only the extreme rapidity and thoroughness of action of the electric precipitator which makes the process practicable in such cases. A suitable form of electric precipitator is shown in Figs. 1 and 3 and comprises a casing containing collecting electrodes 13 and discharge electrodes 14, said casing being connected to receive the gases from pipe 1, and to discharge the gases through pipe 1' to fan or blower 3. Means 5 are provided at the bottom of this casing for removing the precipitated material. The collecting electrodes 13 are formed as plates or members presenting large surface, and the discharge electrodes 14 are formed as fine wires or equivalent members adapted, by reason of their small surface and their shape, to facilitate discharge and produce ionization of the gas, with resultant charging of the particles suspended in the gas, these charged particles being caused to precipitate upon the electrodes under the action of the electric field between the electrodes. Discharge electrodes 14 may be hung from insulated supports 20. Suitable electric connections are provided for maintaining sufficiently high potential difference between the electrodes 13 and 14, to produce the discharge aforesaid. For this purpose the discharge electrodes 14 may be connected by wire to a rectifier 17, which is connected to receive and rectify alternating high tension current from a transformer 18. The collecting electrodes 13 may be grounded and the rectifier 17 may be provided with ground connections to complete the circuit.

Our method is carried out in the above described apparatus as follows: Assuming that the method is to be applied to the recovery of the waste chlorin from the usual absorption towers or chamber in a bleaching powder works, the chlorin laden gases from such towers or chambers are drawn through the flue or pipe 1 by the action of the fan 3, and the absorbing agent, namely the finely divided calcium hydroxid, is fed into the intake pipe of fan 6, which draws such dust along with the current of gases drawn through the pipe 8 by said fan and delivers the dust in the form of a cloud of suspended particles into the flue 1. These suspended particles become distributed throughout the body of gases in the flue 1, the length of said flue being sufficient to insure that such distribution will take place before the gases reach the treater 2, and that the particles of calcium hydroxid will be given full opportunity to absorb the chlorin from the body of gases. The body of gases drawn into the treater 2 from the flue or pipe 1 contains suspended particles consisting, in general, of a mixture of calcium hydroxid and calcium oxychlorid, etc., the percentage of the latter depending on the relative proportions of chlorin and lime dust in the gases passing in the flue 1. In passing through the treater 2, the action of the electric discharge causes ionization of the gases, charging of the suspended particles, and precipitation of such charged particles upon the electrodes. The product thereby precipitated on the electrodes falls, or is removed, into suitable collecting means 5 at the bottom of the precipitator, whence it may be removed in any suitable manner for example by screw conveyers. The gases, substantially free from chlorin, pass from the treater through the fan 3 to the outlet 4, whence, being innocuous, they may be discharged into the atmosphere. It is obvious that an impure calcium hydroxid could be injected in place of pure material, and that lime or hydrated lime charged with a certain amount of chlorin by this process or otherwise, could be injected into the chlorin laden gases, and the chlorin content of the product thereby increased. While the thoroughness of separation of the chlorin by this process makes it advantageous in the removal of the chlorin escaping from the usual absorption towers or chambers, the rapidity of action and large capacity of the method also makes it available for use independently of such towers or chambers, the chlorin laden gases being in that case delivered to the flue 1 directly from the source thereof, and the chlorin being absorbed wholly by our improved method. Thus by providing a plurality of dust feeders arranged at different points along the flue, with a precipitator after each feeder, supplying fresh calcium hydroxid to the last feeder in the series, returning the partially charged precipitate resulting therefrom to the next preceding feeder, and in similar manner supplying each feeder with the charged product from the next succeeding feeder and precipitator, the chlorin content may be increased up to the limit of possible absorption by the calcium hydroxid. An apparatus suitable for this purpose is shown in Fig. 4. A drying tower 25, containing, for example, quicklime, is provided for drying the chlorin-bearing gases, and temperature controlling means 22, consisting, for example, of a pipe for containing a cooling medium, is provided for maintaining the gases at the proper temperature during the operation. The calcium hydroxid is taken from supply pit $a$, fed into the pipe 1 in advance of the last precipitator $2^c$; the precipitate from the latter is conveyed by conveyer 5 to pit $b$, whence it is fed to pipe 1, in advance of the first feeding and the resulting cloud of particles, containing an increased amount of chlorin is precipitated by precipitator $2^b$. Similarly the precipitate from precipitator $2^b$ is conveyed to pit $c$ and returned to pipe 1 and again treated with fresh chlorin-bearing gas and the final precipitate, in precipitator $2^a$ is conveyed to pit $d$.

The means just described provides for control of the temperature so as to maintain the gas sufficiently cool for proper reaction to take place with the calcium hydroxid for producing bleaching powder of good quality. It also provides for drying and purifying the gas, by the action of the quicklime in removing moisture and $CO_2$ and thereby aids in the production of bleaching powder of good quality. Excessive temperature due to reaction of the hydroxid and chlorin and the presence of moisture and $CO_2$, derived principally from the air mixed with the chlorin, tend to seriously injure the quality of the bleaching powder produced, and these objectionable actions are avoided by the operations above described. An important advantage of our process is that the action of the electrical field produces violent agitation and relative motion of the absorbent particles and the gas, so as to expedite and complete the absorbing action.

Another advantage of the use of our treater is that the deposited lime, on the plates, continues to absorb chlorin while the gases are passing between the plates, due both to proximity of passing gas and to electric field causing electric windage. For instance, a heavy deposit of dust can be placed upon the collecting plates, and then chlorin-laden gases introduced, even without carrying suspended particles of hydrated lime, and the electric field will accelerate the absorption of the chlorin by the previously deposited dust. The electrical windage also operates advantageously in agitating the gases and bringing them into effective contact with the suspended particles. In many cases the ionizing action of the electrical field may also be of direct advantage in promoting the chemical reaction between the absorbing agent and the gaseous constituent with which it is to react.

The absorbing material may operate by chemical combination with a constituent of the gaseous body as in the above described instance, or it may absorb such constituent by physical action such as by solution, absorption, occlusion, or otherwise, so that the cloud, fog or mist or fume of suspended particles carries the constituent or constituents which are to be removed. In some cases the material injected into the gas in the form of a cloud may have a catalytic action upon the gas or on a constituent thereof, producing products which are wholly or partly absorbed by such cloud, so that by precipitating the cloud, such products are removed from the gas.

Among the many other applications of our invention in the industries the following may be mentioned: the removal of moisture from the air passing to blast furnaces, by introducing a dehydrating agent, such as pulverized calcium chlorid, into such air and then precipitating such agent; and in all such applications of our invention the precipitation of the cloud of particles by electric means is of advantage in that it enables particles of extreme fineness to be used, such as could not be economically precipitated by the usual means.

Our invention may also be applied with advantage to the removal of traces of gases, in a mixture of gases, as rapidly as they are formed, in such reversible reactions as require very low concentration of the products of reaction. As an illustration of this may be taken the direct synthesis of ammonia from nitrogen and hydrogen, where the equilibrium point of the reaction demands a very low concentration of the reaction product to permit of appreciable formation of ammonia. In this case, according to our invention, the gases will have intimately mixed with them an absorbing agent such as phosphoric acid or boric acid which will absorb the ammonia as rapidly as formed and prevent its concentration rising to the equilibrium point of the reaction. The absorbing material could either be precipitated immediately or could be kept in constant circulation within the apparatus until its ammonia content rose to a desired concentration and the absorbing material then precipitated and removed.

What we claim is:

1. The method of separating a constituent from a gas or mixture of gases which consists in distributing into such gas or mixture of gases suspended particles of solid material capable of reacting with such constituent to absorb the same and of forming a cloud or mist, and then precipitating such cloud or mist by subjecting the gas to the action of an electric field.

2. The method of separating a constituent from a gas or mixture of gases, which consists in mixing with such gas or mixture of gases a finely divided non-gaseous material capable of absorbing such constituent and of forming a cloud or mist of suspended particles containing such constituent, and then precipitating such cloud or mist by subjecting the gas containing the cloud or mist to the action of an electric field.

3. The method of separating a constituent from a gas or mixture of gases, which consists in injecting into such gas or mixture of gases, dust or solid particles capable of reacting with such constituent chemically or physically, to absorb the same, and of forming a cloud or mist containing such constituent, and then precipitating such cloud or mist by subjecting the gas containing such cloud or mist to the action of an electric field.

4. The method of separating a gaseous constituent from a mixture of gases which consists in injecting into such mixture, solid particles capable of suspension in the gases and of absorbing such constituent and of forming a cloud or mist of suspended particles, and then precipitating said cloud or mist by subjecting the gas containing such cloud or mist to the action of an electric field.

5. The method of separating a gaseous constituent from a mixture of gases, which consists in injecting into such mixture, solid particles in such manner as to form a cloud or mist of particles containing said constituent, and then precipitating such cloud or mist by subjecting the gas containing the cloud or mist to the action of an electric field.

6. The method of separating a constituent from a gas or mixture of gases which consists in distributing in the gas or mixture of gases a finely divided solid material capable of forming, with such constituent, a cloud of suspended particles, and then passing the gas containing such cloud through an electric field in which an electric discharge is maintained, so as to precipitate said cloud.

7. The method of separating a gaseous constituent from a mixture of gases, which consists in injecting into such mixture, finely divided solid material, capable of absorbing such constituent, and of forming a cloud of suspended particles, containing such constituent, and then passing the gas, containing such cloud, through an electric field in which an electric discharge is maintained, thereby precipitating such cloud.

8. The method of separating a constituent from a gas or mixture of gases, which consists in distributing in such gas or mixture of gases a finely divided solid material capable of reacting chemically or physically with such constituent to form a cloud of suspended particles, containing such constituent, and then subjecting the gas containing such cloud, to the action of an electric field, to precipitate such particles.

9. The method of separating a constituent from a gas or mixture of gases, which consists in injecting into such gas or mixture of gases, dust or solid particles capable of reacting with such constituent chemically or physically, to absorb the same, and of forming a cloud or mist containing such constituent, and then precipitating such cloud or mist by subjecting the gas containing the cloud or mist to the action of an electric field.

10. The method of separating a gaseous constituent from a mixture of gases which consists in injecting into such mixture, solid particles capable of suspension in the gases and of absorbing such constituent, and of forming a cloud or mist of suspended particles, and then precipitating said cloud or mist by subjecting the gas containing the cloud or mist to the action of an electric field.

11. The process of treating gases containing free chlorin, which consists in injecting into such gases, finely divided calcium hydroxid, to absorb the chlorin and to form a cloud of particles containing the chlorin together with the calcium hydroxid, and then precipitating the cloud of particles by the action of an electric field.

12. The process of treating gases containing free chlorin, which consists in distributing into the gas, finely divided calcium hydroxid, to absorb the chlorin and to form a cloud of particles containing the chlorin together with the calcium hydroxid, and then precipitating such cloud of particles by the action of an electric field, the humidity of the gas being controlled to provide for effective absorbing action.

13. The process of treating gases containing free chlorin, which consists in feeding and distributing into a current of the gas, finely divided calcium hydroxid, precipitating the resulting cloud of particles containing chlorin and calcium hydroxid, passing the precipitate again into the gas current in advance of the first feeding, and precipitating the resulting cloud of particles containing calcium hydroxid with an increased quantity of chlorin.

14. The process of absorbing a constituent from gases, which consists in feeding into a current of such gases, finely divided material capable of absorbing such constituent, precipitating the resulting cloud of particles, feeding such precipitate into said current in advance of the first feeding and precipitating the resulting cloud of finely divided material containing an increased amount of the gaseous constituent.

15. The process of producing chlorid of lime which consists in feeding calcium hydroxid into a current of gas containing free chlorin, maintaining the gas at a temperature suitable for proper reaction of the chlorin and the calcium hydroxid so as to form a cloud of suspended particles containing chlorid of lime, and precipitating such cloud of suspended particles by the action of an electric field.

16. The process of absorbing a constituent from gases which consists in supplying and distributing particles of absorbent material in the gas, passing the gas between electrodes and maintaining a difference of potential between said electrodes to produce an electric field of sufficient strength to precipitate the absorbent material and to cause electric windage in contact with deposited material for promoting absorption of said constituent by said absorbent material.

17. The process of separating a constituent from a gas which consists in injecting into said gas a non-gaseous finely divided material capable of absorbing such constituent, so as to form a cloud of suspended particles and subjecting the gas containing said cloud of suspended particles to the action of an electrical field and precipitating such particles with the gas constituent absorbed thereby.

18. The process of removing chlorin from a gas containing the same, consisting in distributing calcium hydroxid through such gas, in a finely divided state, to form a cloud and precipitating such cloud by the action of an electrical field, the amount of calcium hydroxid used being sufficient to effectively absorb and retain the chlorin in said gas.

LINN BRADLEY.
WALTER AUGUST SCHMIDT.

Witnesses to signature of Linn Bradley:
  ALFRED H. WHITE,
  J. W. BATTZU.

Witnesses to signature of Walter August Schmidt:
  WM. N. DREW,
  H. M. MOSHER.